(12) United States Patent
Adireddy et al.

(10) Patent No.: US 10,741,075 B2
(45) Date of Patent: Aug. 11, 2020

(54) INTELLIGENT PARKING MANAGING SYSTEM, AND METHODS OF UTILIZING SAME

(71) Applicant: Continental Automotive Systems, Inc., Auburn Hills, MI (US)

(72) Inventors: Ganesh Adireddy, Bloomfield Hills, MI (US); Javier Alcazar, Royal Oak, MI (US); Dominik Froehlich, Royal Oak, MI (US); Ibro Muharemovic, Warren, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/127,917

(22) Filed: Sep. 11, 2018

(65) Prior Publication Data

US 2019/0088128 A1  Mar. 21, 2019

Related U.S. Application Data

(60) Provisional application No. 62/560,691, filed on Sep. 20, 2017.

(51) Int. Cl.
*G08G 1/14* (2006.01)
*G06Q 30/02* (2012.01)
(Continued)

(52) U.S. Cl.
CPC ............ *G08G 1/144* (2013.01); *G06Q 10/02* (2013.01); *G06Q 20/127* (2013.01); *G06Q 30/0284* (2013.01); *G07B 15/02* (2013.01); *G07F 17/24* (2013.01); *G08G 1/04* (2013.01); *G08G 1/143* (2013.01); *G08G 1/146* (2013.01); *G08G 1/147* (2013.01); *G08G 1/148* (2013.01)

(58) Field of Classification Search
CPC .... G08G 14/144; G08G 14/04; G08G 14/143; G08G 14/146; G06Q 20/127; G06Q 30/0284; G07B 15/02; G07F 17/24
USPC ......................................... 340/932.2
See application file for complete search history.

(56) References Cited

U.S. PATENT DOCUMENTS

2005/0083212 A1\* 4/2005 Chew ...................... G08G 1/14
340/932.2
2010/0007525 A1  1/2010 Shanbhag et al.
(Continued)

FOREIGN PATENT DOCUMENTS

WO  2006096848 A2  9/2006
WO  2017141256 A1  8/2017

OTHER PUBLICATIONS

International Search Report and Written Opinion dated Dec. 13, 2018 from corresponding International Patent Application No. PCT/US2018/051267.

*Primary Examiner* — Omar Casillashernandez

(57) ABSTRACT

There is disclosed a system, method and software program for managing parking spaces in a geographical area. The system, method and software program includes monitoring the geographical area; identifying one or more available parking spaces in the geographical area based at least partly upon the monitoring; informing, over the air interface, one or more vehicle operators about a first available parking space of the one or more available parking spaces identified; and completing a parking reservation for the first available parking space with a first vehicle operator of the one or more vehicle operators.

21 Claims, 6 Drawing Sheets

(51) Int. Cl.
   *G06Q 20/12*   (2012.01)
   *G06Q 10/02*   (2012.01)
   *G07B 15/02*   (2011.01)
   *G07F 17/24*   (2006.01)
   *G08G 1/04*    (2006.01)

(56) References Cited

U.S. PATENT DOCUMENTS

| | | | |
|---|---|---|---|
| 2012/0092190 A1* | 4/2012 | Stefik | G06Q 10/02 |
| | | | 340/932.2 |
| 2012/0299749 A1 | 11/2012 | Xiao et al. | |
| 2014/0145862 A1* | 5/2014 | Wang | G08G 1/141 |
| | | | 340/932.2 |
| 2014/0347196 A1* | 11/2014 | Schulz | G08G 1/096716 |
| | | | 340/932.2 |
| 2015/0009048 A1* | 1/2015 | Wang | G08G 1/144 |
| | | | 340/932.2 |
| 2017/0256165 A1 | 9/2017 | Pennington et al. | |
| 2017/0327035 A1* | 11/2017 | Keiser | B60Q 9/008 |
| 2018/0096263 A1* | 4/2018 | Modi | G07B 15/00 |

* cited by examiner

INTELLIGENT PARKING MANAGING SYSTEM, AND METHODS OF UTILIZING SAME

CROSS REFERENCE TO RELATED APPLICATION

The present application claims the benefit of U.S. provisional application 62/560,691, filed Sep. 20, 2017, entitled "An Intelligent Parking Managing System, and Methods of Utilizing Same," the content of which is hereby incorporated by reference herein in its entirety.

FIELD OF INVENTION

The present invention generally relates to a parking monitoring system, and particularly to a system, software program and method for managing the use of parking spaces in a geographical area.

BACKGROUND

In certain geographies, parking a motor vehicle is oftentimes seen as an adventure at best and a nightmare at worst. Finding an available parking space is often too time consuming. For parking spaces having more traditional parking meters, the driver is sometimes forced to return to his/her vehicle's space prematurely for additional payment in order to ensure that a parking ticket is not issued or the vehicle is not towed. For municipalities, the costs associated with enforcing payment for use of its parking spaces include personnel salaries and associated equipment for manually monitoring the spaces. Even with relatively strict enforcement, municipalities still lose parking revenue due to drivers parking vehicles without paying the necessary parking fee. To be sure, there exists a need for easier parking space locating and payment by motor vehicle drivers while ensuring that parking fees are suitably collected by municipalities.

SUMMARY

According to the example embodiments, there is disclosed a method of managing parking spaces in a geographical area. The method includes monitoring the geographical area; identifying one or more available parking spaces in the geographical area based at least partly upon the monitoring; informing, over the air interface, one or more vehicle operators about a first available parking space of the one or more available parking spaces identified; and completing a parking reservation for the first available parking space with a first vehicle operator of the one or more vehicle operators.

The method may further include receiving a first indication from the first vehicle operator when the first vehicle operator arrives at the first available parking space, receiving a second indication from the first vehicle operator when a vehicle of the first vehicle operator is leaving the first available parking space, and calculating a parking fee based upon a time when the first indication is received and a time when the second indication is received.

The method may include receiving from the first vehicle operator a request to extend a duration of the parking reservation, and sending a reply to the first vehicle operator responsive to the request to extend the duration of the parking reservation.

The method repeats the monitoring, the identifying and the informing at predetermined times.

In an example embodiment, the method includes receiving from one or more vehicles in the geographical area parking space information of parking spaces in the geographical area, wherein identifying one or more available parking spaces in the geographical area is based at least partly upon the received parking space information, In another example embodiment, the method includes indicating at the first available parking space of a period of time corresponding to the parking reservation for the first available parking space. The method may include sending a notification to the first vehicle operator that the parking reservation is nearing an end or has ended.

In one aspect, informing the one or more vehicle operators comprises updating a software application with data corresponding to the first available parking space, the one or more vehicle operators being subscribers of the application.

The method may determine that a second available parking space of the one or more available parking spaces is impermissibly occupied, determining that the second available parking space is occupied by a vehicle associated with a second vehicle operator of the one or more vehicle operators, and sending a message to the second vehicle operator to reserve the second available parking space. In addition, the method may determine that a second vehicle has parked in a no-parking location in the geographical area, determining that the second vehicle is associated with a second vehicle operator of the one or more vehicle operators, and sending a message to the second vehicle operator that the second vehicle is parked in the no-parking location.

Other example embodiments are directed to a software program code product for managing parking spaces in a geographical area, the program code product stored in non-transitory memory and including instructions which, when executed by a processor, causes the processor to perform monitoring the geographical area; identifying one or more available parking spaces in the geographical area based at least partly upon the monitoring; informing one or more vehicle operators about a first available parking space of the one or more available parking spaces identified; and completing a parking reservation for the first available parking space with a first vehicle operator of the one or more vehicle operators.

The program code may include instructions for receiving a first indication from the first vehicle operator when the first vehicle operator arrives at the first available parking space, receiving a second indication from the first vehicle operator when a vehicle of the first vehicle operator is leaving the first available parking space, and calculating a parking fee based upon a time when the first indication is received and a time when the second indication is received.

The program code may include instructions for receiving from the first vehicle operator a request to extend a duration of the parking reservation, and sending a reply to the first vehicle operator responsive to the request to extend the parking reservation.

The program may further include instructions for repeating the monitoring, the identifying and the informing at predetermined times.

The program code may include instructions for receiving from vehicles in the geographical area parking space information of parking spaces in the geographical area, wherein identifying one or more available parking spaces in the geographical area is based at least partly received parking space information.

The program code may have instructions for indicating at the first available parking space of a period of time corresponding to the parking reservation for the first available parking space.

In an aspect, the program code includes instructions for determining that a vehicle in the geographical area is impermissibly parked, determining that the impermissibly parked vehicle is associated with a second vehicle operator of the one or more vehicle operators, and sending a message to the second vehicle operator concerning the impermissibly parked vehicle.

The program code product may utilize a self-learning algorithm for identifying the one or more available parking spaces in the geographical area.

Other example embodiments are directed to a software application for reserving a parking space, stored in non-transitory memory and having instructions which, when executed by a processor, causes displaying, on a display screen of a device on which the software application is operated, one or more available parking spaces in a geographical area; receiving from a user of the software application a selection of a first available parking space of the one or available parking spaces; sending, over the air interface in one or more transmissions, a request to reserve the first available parking space, the request including a period of time during which the first available parking space is to be reserved; sending, over the air interface, a confirmation to reserve the first available parking space for the period of time; sending, over the air interface, a notification around a time a vehicle of the user of the software application begins occupying the first available parking space; and sending, over the air interface, a notification around a time the vehicle of the user of the software application is leaving the first available parking space.

The software application may include instructions for sending, over the air interface and in response to input received from the user of the software application, a request for extending the period of time for the reservation of the first available parking space, and receiving over the air interface a response to the request.

The software application may also include instructions for receiving a notification that the period of time for the reservation is near an end or has ended. Further, the software application may include instructions for receiving, from the user of the software application or the device on which the software application is operated, parking space information for the geographical area, and sending the parking space information over the air interface

BRIEF DESCRIPTION OF THE DRAWINGS

Aspects of the invention will be explained in detail below with reference to exemplary embodiments in conjunction with the drawings, in which.

DETAILED DESCRIPTION

The following description of the example embodiments is merely exemplary in nature and is in no way intended to limit the invention, its application, or uses.

The example embodiments presented herein are generally directed to a system, software product and operating method for managing vehicle parking in a geographical area. The system monitors parking spaces along one or more streets in the geographical area and identifies the parking spaces therein which are unoccupied and thus available for use. A software application, downloaded onto vehicles or hand-held smart devices, such as a mobile telephone, is used by subscribers of the application to receive information about the identified available parking spaces and reserve such spaces. Parking fees are automatically calculated and communicated to the subscribers via the application.

Figure 1:
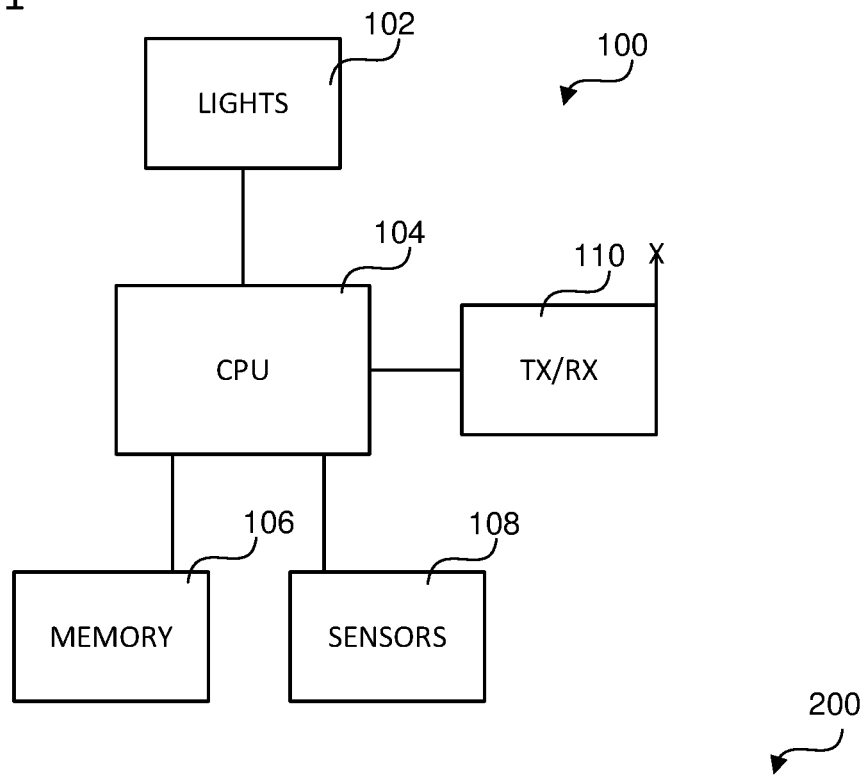
FIG. 1 is a block diagram of an intelligent traffic light according to an example embodiment.

FIG. 1 is a block diagram depicting a traffic light 100 according to an example embodiment. Traffic light 100 includes lights 102, the sequenced illumination of which provide instructions to drivers of vehicles entering an intersection, as is widely known. Each light 102 may be a single light or formed from a plurality of smaller lighting devices, such as light emitting diodes.

Lights 102 are coupled to and controlled by a central processing unit (CPU) 104. CPU 104 may be formed from one or more processors, processing elements and/or controllers. Memory 106 is coupled to CPU 104 and includes nonvolatile memory having stored therein software and/or program code having instructions which, when executed by CPU 104, results in, among other things, CPU 104 managing (or assisting in the management of) parking in the geographical area.

As shown in FIG. 1, a sensor arrangement 108 is coupled to CPU 104. In an example embodiment, sensor arrangement 108 includes sensors, cameras and/or other devices for sensing vehicles in the field of view of the sensors. The number of sensors, cameras, etc. in sensor arrangement 108 is sufficient to view in any desired direction. For example, if traffic light 100 controls the intersection of two streets that are orthogonal to each other, sensors in sensor arrangement 108 are capable of monitoring traffic in four directions (i.e., in both directions of each street). The output of sensors of sensor arrangement 108 is provided to CPU 104 which determines, among other things, whether parking spaces are available along the monitored streets, as described in greater detail below.

Traffic light 100 further includes transceiver 110 coupled to CPU 104 for communicating information over the air interface. Transceiver 110 includes a transmitter and a receiver. In an example embodiment, traffic light 100 may utilize radio frequency communication, and particularly the Dedicated Short Range Communication (DSRC) protocol in communicating over the air interface. It is understood, however, that traffic light 100 may utilize other known communication protocols, including code division multiple access (CDMA), global system for mobile (GSM), long-term evolution (LTE), wireless local area network (WLAN) and/or Wi-Fi, and/or protocols which have not yet been developed for communicating over the air interface. Traffic light 100 may additionally or alternatively utilize other technologies, techniques and protocols for communicating over the air interface. In another example embodiment, traffic light 100 additionally or alternatively communicates over a hardwired connection, such as over a coaxial or fiber optic cable interface.

Figure 2:
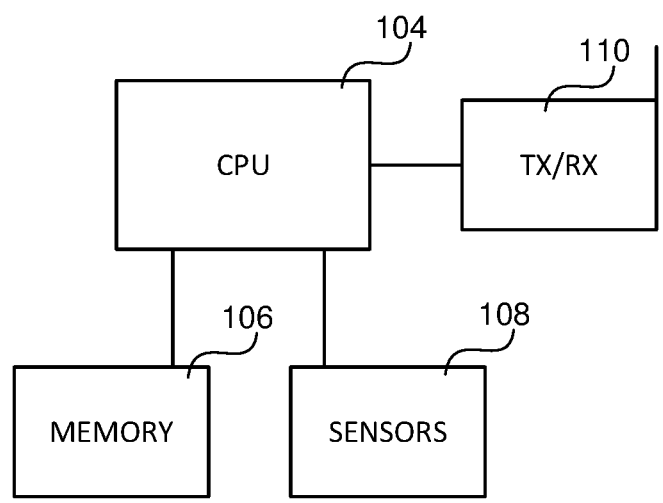
FIG. 2 is a block diagram of a sensing device according to an example embodiment.

In the example embodiments discussed above, traffic lights 100 monitor parking spaces from intersections via the use of sensor arrangement 108. In another example embodiment, a sensor arrangement 108 may be deployed along streets and/or street intersections in a geographical area to which no traffic light 100 is associated. For example, a sensing device 200 (FIG. 2) may include much of the same components of traffic light 100 of FIG. 1, including a CPU 104, memory 106, sensor arrangement 108 and transceiver 110. However, sensing device 200 does not include lights 102 or the program code in memory 106 for controlling lights 102. Instead, CPU 104 of sensing device 200, by executing program code stored in memory 106, simply controls the monitoring of parking spaces from the location of sensing device 200, and optionally identifying unused and thus unavailable parking spaces based upon the monitoring, and transmitting the monitored parking data and/or the identified available parking spaces.

Figure 3:
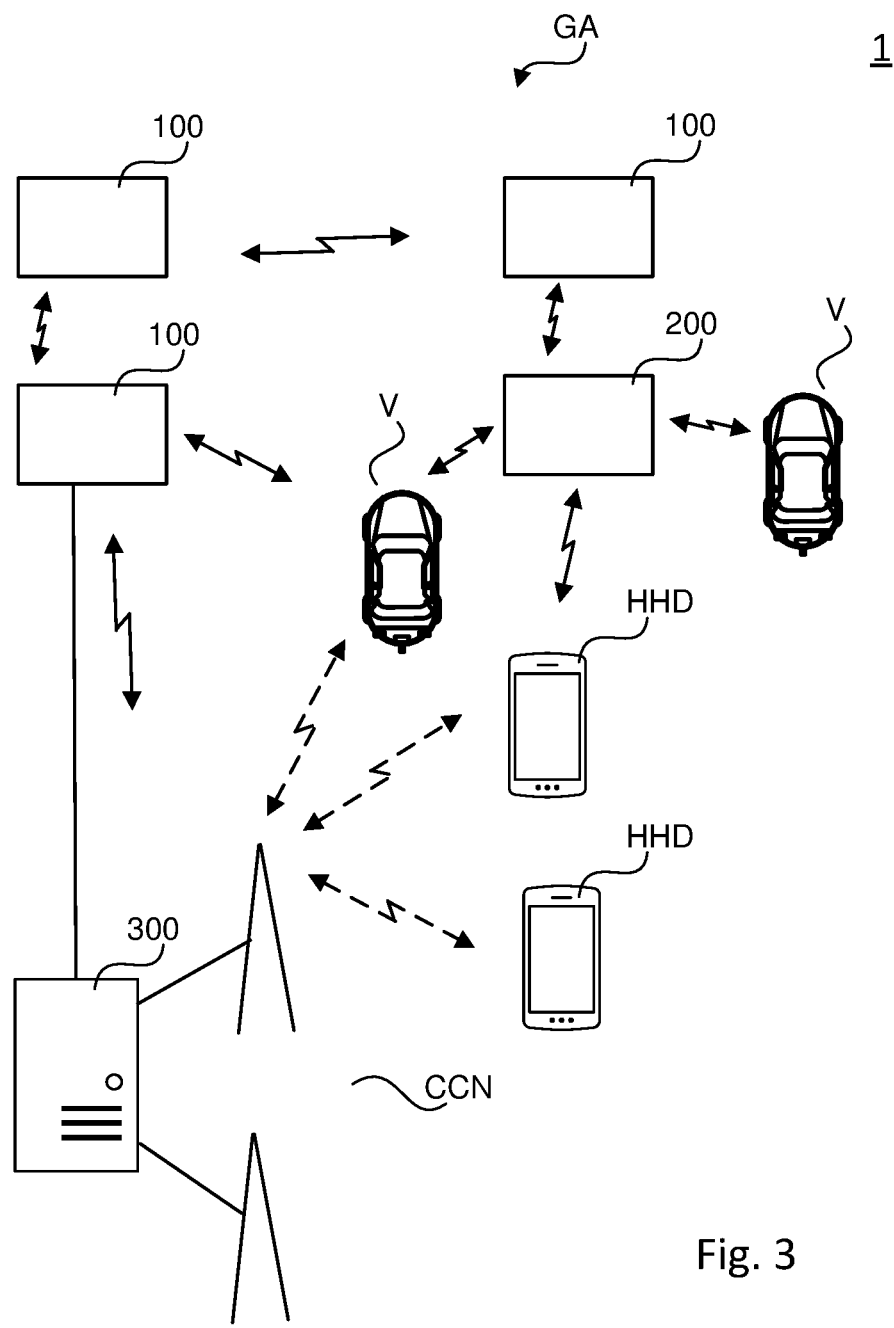
FIG. 3 is a schematic diagram illustrating an intelligent parking management system according to an example embodiment.

FIG. 3 illustrates a system 1 for managing parking in a geographic area GA according to an example embodiment. In the drawing, three traffic lights 100 and one sensing device 200 are illustrated for exemplary purposes only, and it is understood that more or less traffic lights 100 and sensing devices 200 may be employed in a system. Traffic lights 100 and sensing device 200 communicate with each other over the air interface using transceivers 110 thereof. Traffic lights 100 and sensing device 200 also communicate with vehicles V and hand-held devices HHD over the air interface. System 1 may further include a computing device 300 which communicates with one or more of traffic lights 100 and sensing device 200, over the air interface or via a hardwired connection, or both. Computing device 300 may include a CPU and associated memory for maintaining software programs and/or program code, and parking related data. Computing device 300 may be coupled to a cellular communication network CCN for communicating with vehicles V and hand-held devices HHD, using known cellular communication techniques and protocols, including GSM, CDMA, and LTE. Communication with vehicles V and hand-held devices HHD over the air interface using known cellular communication techniques is shown in FIG. 3 as dashed arrows. In this way, system 1, via computing device 300, is able to communicate with vehicles V and hand-held devices HHD if vehicles V and hand-held devices HHD are out of the communication range for traffic lights 100 and sensing device 200. This may be advantageous if traffic lights 100 and sensing device 200 utilize a wireless communication technology/protocol which has a relatively small communication range, such as DSRC.

System 1 is a parking management system in which available parking spaces are identified and communicated to drivers seeking parking spaces. In addition, system 1 allows for such drivers to reserve parking spaces and calculates charges therefor. Traffic lights 100 and sensing devices 200 monitor streets for use in identifying available and/or unused parking spaces along streets. In example embodiments, available parking spaces are communicated to drivers, and reservations made thereby, via a software application which may be installed on hand-held devices HHD and/or vehicles V.

Figure 4:
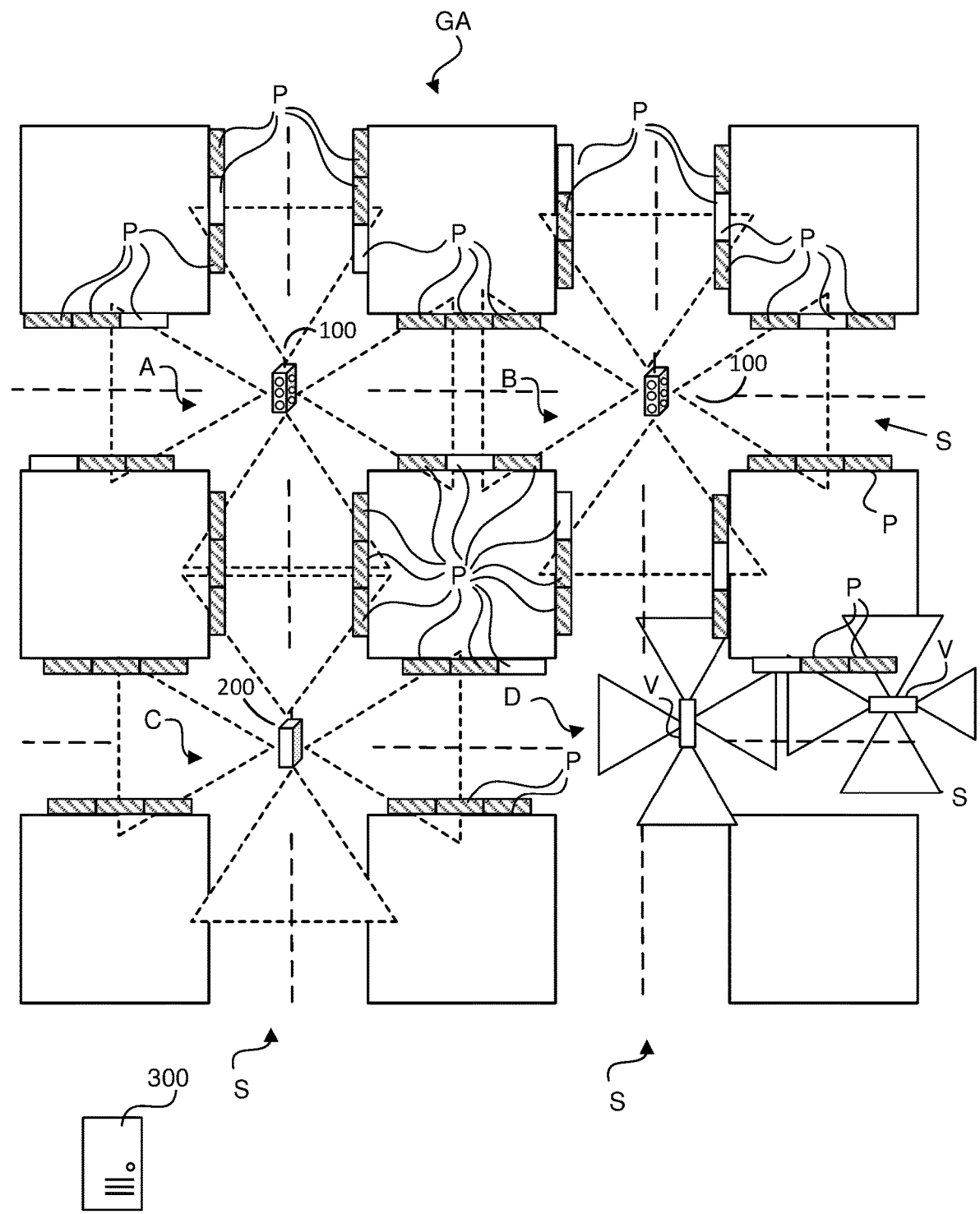
FIG. 4 is a top view of a city area having traffic lights of FIG. 1 and a sensing device of FIG. 2 at street intersections.

FIG. 4 is a view of a geographical area GA in which system 1 is disposed. Here, each traffic light 100 and sensing device 200 is disposed at an intersection A-C of two streets S. Sensors of sensor arrangement 108 of each traffic light 100 and sensing device 200 are configured to capture and/or monitor the status of parking spaces in each direction of streets S from intersections A-C. FIG. 4 illustrates, as dashed-line triangles, the monitoring/sensing range of sensor arrangement 108 of traffic lights 100 and sensing device 200. It is understood that the monitoring range of traffic lights 100 and sensing device 200 are shown for exemplary purposes only and that other monitoring ranges are possible. In FIG. 4, parking spaces P are located along each street S. In the drawing, parking spaces P are parallel parking spaces relative to streets S, but it is understood that parking spaces P may be angled parking spaces along streets S.

The operation of parking management system 1 will be described with respect to FIG. 5. The operation may be performed by one or more traffic lights 100, one or more sensing devices 200, and/or computing device 300 executing program code maintained thereby. Initially, at 500 one or more traffic lights 100 and/or one or more sensing devices 200 monitor or otherwise capture data using sensor arrangement 108 therein. The monitoring/capturing may be performed continuously, periodically or regularly. The monitored/captured data may be, for example, video segments and/or a plurality of still images, and are stored in memory, such as memory 106 of the corresponding traffic light 100 or sensing device 200, or in memory in computing device 300. A traffic light 100 and/or sensing device 200 may receive at 502 monitored data from one or more vehicles V in geographic area GA. Specifically, vehicles V in geographic area GA which have vehicle-to-infrastructure (V2X) capability, and thus are configured to communicate with traffic lights 100 and sensing device 200, and which also have sensors for capturing video/images, provide captured video/images of streets S to nearby traffic lights 100 and sensing device 200. Additionally or alternatively, vehicles V provide captured video/images of streets S to computing device 300 over the air interface. The sensing range of vehicles V are depicted as triangles in FIG. 4. Though FIG. 4 shows vehicles V sensing in four directions. It is understood that the cameras, sensors, etc. of vehicles V may provide a full 360 degrees of sensing/monitoring around the vehicles.

Figure 5:
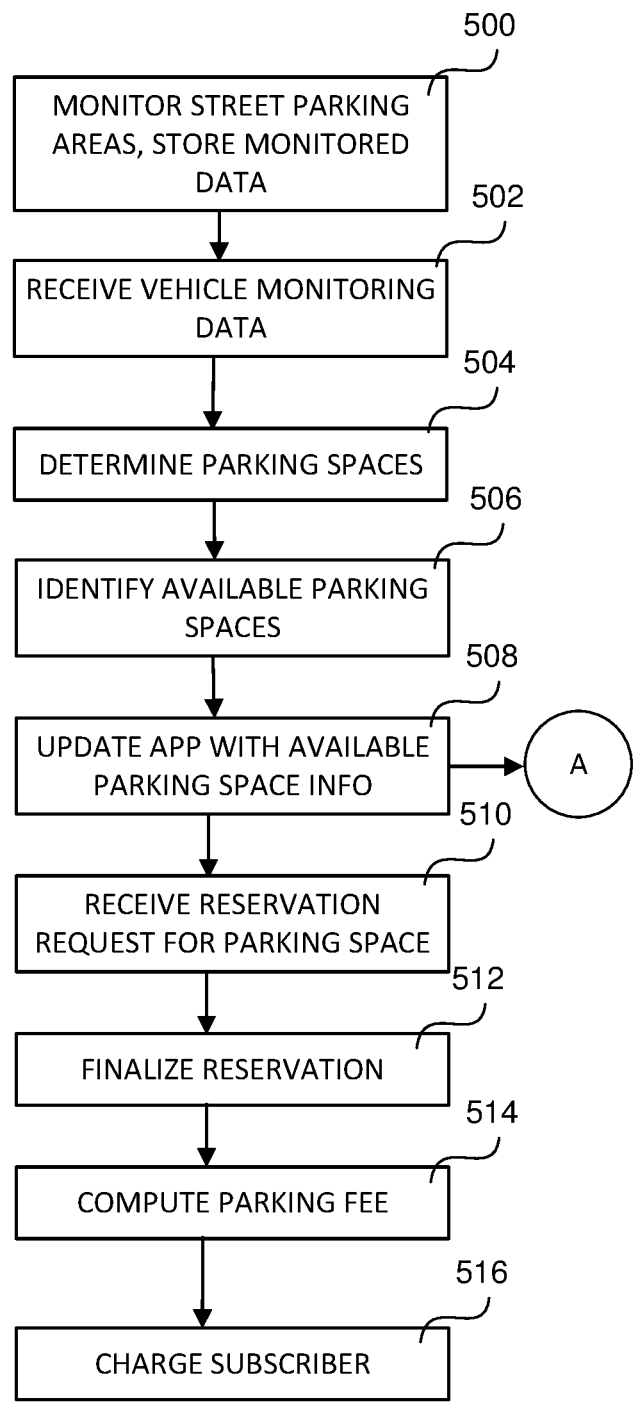
FIG. 5 is a flowchart illustrating an operation of the intelligent parking management system, according to an example embodiment.

With monitored images/video of streets S from traffic lights 100, sensing devices 200 and V2X-capable vehicles V, system 1 determines parking spaces P at 504 (FIG. 5). Determining parking spaces may be performed partly by comparing the monitored images/video to a map of known parking spaces P in geographical area GA. Once system 1 has determined parking spaces P in the images/video, system 1 identifies at 506 parking spaces P which are unused and available in geographical area GA. In FIG. 4, available parking spaces P are white and occupied parking spaces P have diagonal lines therethrough.

With continued reference to FIG. 5, system 1 provides at 508 an update of parking information in geographical area GA based upon the identification of available parking spaces P in step 506. In an example embodiment, system 1 maintains a software application which is downloaded by subscribers onto hand-held devices HHD and the electronics system of vehicles V. In this context, system 1 provides the software application with data of the newly identified available parking spaces P. With the software application being provided with the most recently identified available parking spaces P, subscribers of the software application are able to view the available parking spaces P in geographic area GA.

In an example embodiment, the software application, running on hand-held devices HHD and the electronics system of vehicles V, displays a map of geographic area GA having depicted the available parking spaces P therein. Alternatively or additionally, the software application provides the closest ones of the available parking spaces P to the subscriber, based upon a current location of the hand-held device HHD/vehicle V. It is understood that system 1 may inform drivers of the identified available parking spaces P via other methods.

In providing updated available parking spaces P to the software application, system 1 may utilize transceiver 110 in traffic lights 100 and sensing device 200, and/or computing device 300.

At step 510, system 1 receives a parking space reservation request from a subscriber via the software application. The request may be for reserving an available parking space P, either immediately or in the future, such as later that day. In general terms, system 1 cooperates with the subscriber to finalize the reservation for an available parking space P at 512, calculates a parking fee at 514, and charges the parking fee to the subscriber at 516. The activity for finalizing the reservation, calculating the fee and charging the fee to the subscriber is described in greater detail in FIG. 6.

Figure 6:
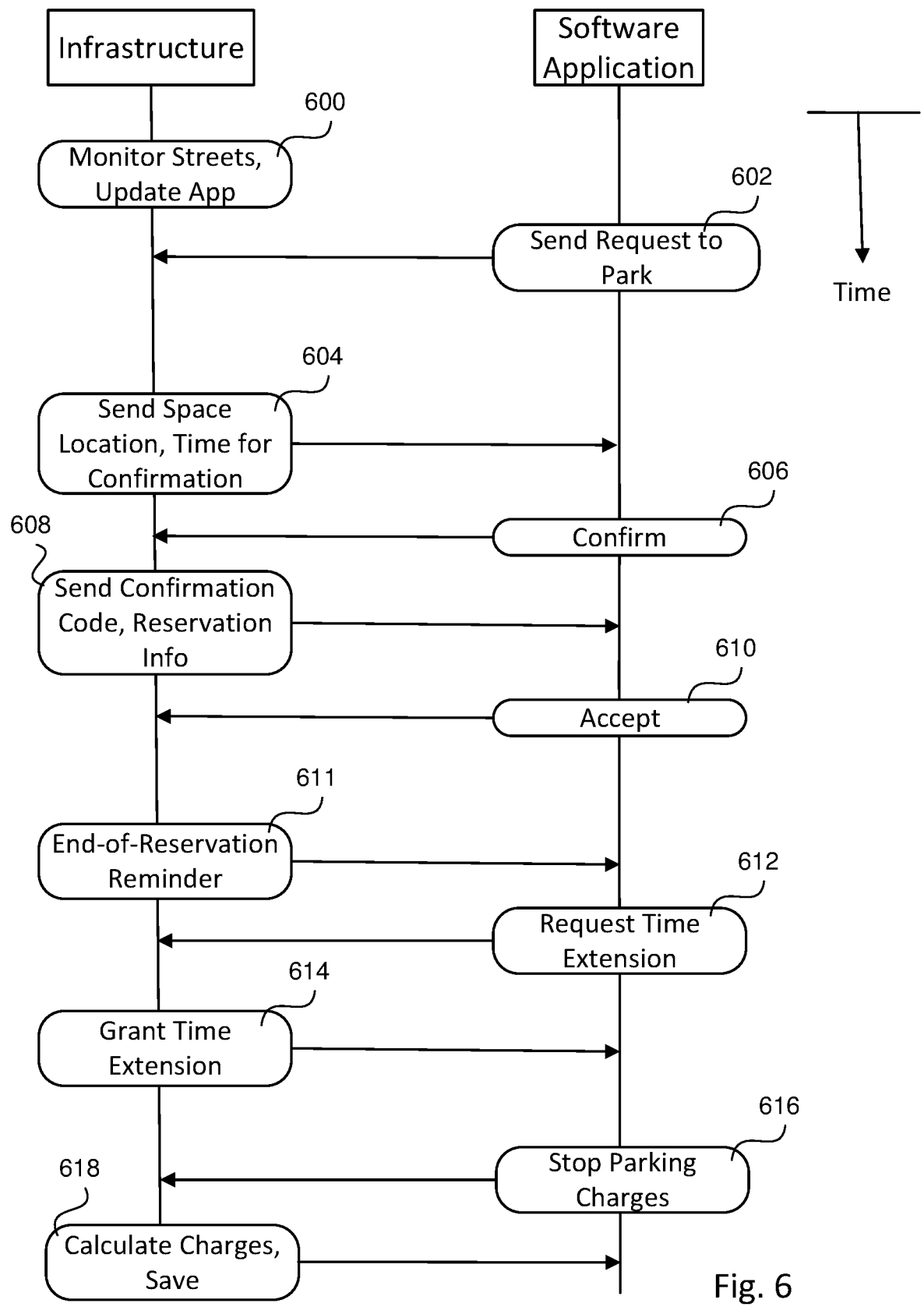
FIG. 6 is a signal diagram illustrating the communication between the intelligent parking management system and an application user, according to an example embodiment.

The detailed activity of system 1 and a subscriber (using the software application) associated with reserving an available parking space P is depicted in FIG. 6 for illustrative purposes only. It is understood that the order of the activity depicted may vary depending upon the particular embodiment. For simplicity, steps 500-508 of FIG. 5 are represented as step 600 in FIG. 6. With the software application accessing current available parking space data and presenting such data to the subscriber, a subscriber may submit a request to system 1 to reserve an available parking space P. In the example embodiment, the request is made through the software application at 602. The request may identify the subscriber and also include additional information, such as the geographical area in which a parking space P is desired as well as a time and/or time period when the available parking space P is desired to be used. In the event the software application shows the subscriber the available parking spaces P prior to the subscriber issuing the request, such as responsive to system 1 determining the current location of the subscriber and/or the subscriber informing system 1 through the software application the desired location, the request may also include the selection of at least one of the available parking spaces P. Upon receipt of the request, system 1 may identify the request and submit a request for confirmation at 604 which also identifies the particular available parking space P to be reserved as well as the reservation time and/or time period. Responsive to the confirmation request, the subscriber submits a confirmation at 606 that the requested parking space P and reservation time are correct, or includes corrected information as to the foregoing. System 1 may submit at 608 a confirmation code along with the details of the parking space reservation. Once the subscriber has arrived at the reserved available parking space P, the subscriber sends an acceptance message at 610 which, in addition to accepting the reservation, starts the occupation of the available parking space P by the subscriber's vehicle.

It is understood that steps 602-610 may occur at around the same time, such as around the time the subscriber vehicle approaches or is parked at the available parking space P. Specifically, request 602 may be sent by the subscriber after the subscriber's vehicle is already parking in the available parking space P.

During the time period of the reservation when the subscriber's vehicle is parked in the parking space P, the subscriber may request an extension of time at 612. The time extension request may be in response to system 1 determining that the reservation time period may be soon ending and sending a reminder of that fact to the subscriber at 611. The extension of time request may include a period of additional time for occupying the parking space P. In response to the time extension request, system 1 may send a grant message at 614 which informs the subscriber that the request has been granted. Otherwise, if system 1 determines that the request cannot be accepted, which may occur if the time extension conflicts with another reservation for the same parking space P, system 1 sends a request denial message to the subscriber. Around the time when the subscriber no longer occupies the parking space P, the subscriber sends a stop message to system 1 at 616 which indicates to system 1 that the subscriber's use of parking space P ends. The reception of the stop message by system 1 may then be used by system 1 to calculate the parking fee for the subscriber, which may be shared with the subscriber at 618. In addition, system 1 may also record the time period during which the parking space P was used, for billing purposes at the next billing cycle. In an example embodiment, the parking fee may be calculated based in part upon a duration of the parking space reservation. For example, the parking fee calculation may take into consideration the duration of the parking space reservation, such as in the event the actual time of parking space usage is less than the reservation duration. The subscriber may pay the parking fee using the software application. Further, system 1 may allow for the fee calculation at step 618 to be based upon parking rates that automatically change based upon the time of day, the day of the week, etc.

Figure 7:
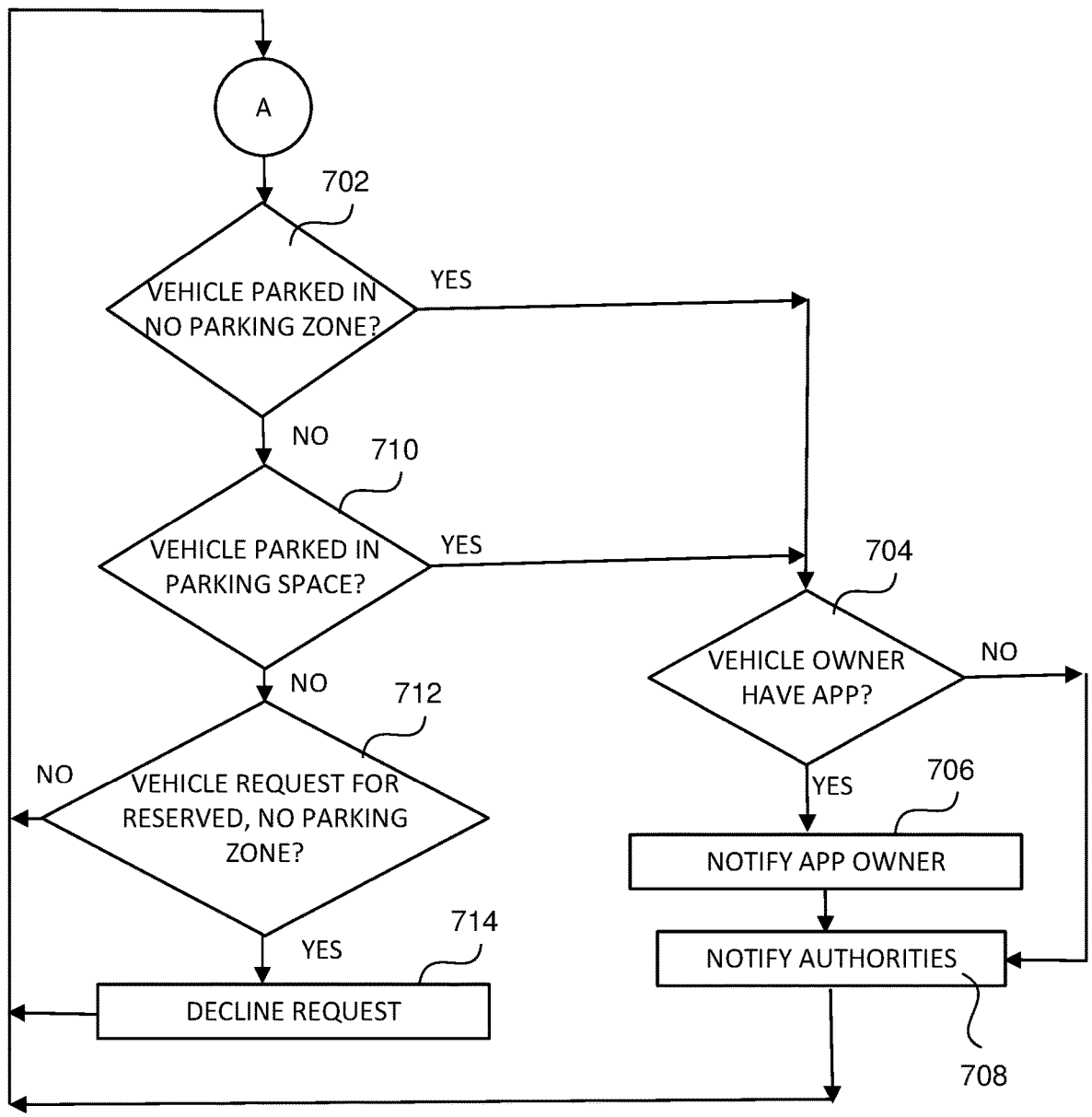
FIG. 7 is a flowchart illustrating more detail of the operation of the intelligent parking management system, addressing additional situations when managing parking spaces in a geographical area.

FIG. 7 illustrates the operation of system 1 in addressing additional situations when managing parking spaces in geographical area GA. Control begins following steps 500-508 from the flowchart of FIG. 5. System 1 also determines at 702, from recently monitored parking spaces P, whether a vehicle is parked in a no-parking zone, i.e., a location where parking is illegal and prohibited. Upon an affirmative determination, system 1 may determine at 704 whether the owner of the parked vehicle is a subscriber and if so, at 706 notify the subscriber via the software application that the vehicle is illegally parked. In addition, system 1 may notify the authorities at 708 for action to be taken thereby, such as the car being towed. In the event the owner of the illegally parked vehicle is not a subscriber or cannot be identified, system 1 may simply notify the authorities at 708. This activity advantageously results in reducing the occurrence of vehicles being parked illegally.

Based upon the recently monitored parking spaces P, system 1 determines at 710 whether a vehicle is parked in an available parking space P without having submitted a reservation request therefor. Upon an affirmative determination, system 1 may perform steps 704-708 as described above. This action advantageously allows for all vehicles to reserve parking spaces P only through system 1 so that system 1 may more efficiently and effectively manage parking in geographical area GA.

With continued reference to FIG. 7, system 1 may determine at 712 whether a received reservation request is for a space that cannot be reserved. For example, the space requested may be in a no-parking zone where it is illegal to park, or the space may be for a parking space P that is currently reserved during the time specified in the received request. In either instance, system 1 may simply send a message to the requesting subscriber at 714 which declines the request.

In an example embodiment, each traffic light 100, sensing device 200 and/or computing device 300 possesses artificial intelligence, self-learning and/or self-adapting capabilities. CPU 104 of traffic light 100 and sensing device 200, and the CPU in computing device 300 may use artificial intelligence, self-learning and/or self adapting algorithms or techniques for determining parking spaces P (step 504), identifying available parking spaces P (step 506), determining whether a vehicle parked in a no-parking zone (step 702), and determining whether a vehicle parked in a parking space without a reservation (step 710). In this regard, symbolic rules and/or neural networks may be utilized for making such determinations and identifications.

In an example embodiment, each parking space P in geographical area GA may further include or be associated with a parking meter (not shown in FIG. 4). In this embodiment, the parking meter is communicatively coupled to one or more traffic lights 100, one or more sensing devices 200, and/or computing device 300. In this embodiment, such parking meter may include one or more lights or a visual display. Once a reservation for an available parking space P has been made at 512, the parking meter corresponding to the now-reserved parking space P may indicate the time period for which the parking space P has been reserved. Alternatively, the parking meter may, for example, illuminate a first color to indicate that the space P has been reserved, and a second color to indicate that the space P is an available parking space.

In another embodiment, in addition to vehicles V providing monitored street data to system 1, hand-held devices HHD may also do the same. Providing monitored street data to system 1 by vehicles V and hand-held devices HHD may be automatic following the owner granting permission via the software application.

System 1, as described above, is described for managing on-street parking in a geographical area. Additionally or alternatively, system 1 may be utilized for managing off-street parking, such as managing parking spaces in a parking lot, open field or parking structure. For example, sensing devices 200 may be utilized for monitoring parking space usage in the lot, field or parking structure. Further, in an example embodiment, the software application downloadable onto hand-held devices HHD may include global positioning system (GPS) software. Alternatively, the software application may operate in conjunction with the GPS function of the hand-held device HHD. The GPS capability allows the subscriber to use the software application to record the location of the parking space used by a subscriber so that the subscriber may quickly find the subscriber's vehicle hours or days after leaving the vehicle in the lot/field/parking structure. The recording of the parking space location may occur automatically around the time the parking space is reserved and/or when the subscriber confirms the parking space reservation. In this way, system 1 and the software application allow for a subscriber to quickly find a parking space to use and reserve, and to quickly find the parking space when the subscriber returns to pick up the subscriber's vehicle.

System 1, as described above, advantageously allows for vehicle drivers to more quickly find and reserve available parking spaces P. System 1 also more efficiently manages parking in parking spaces P. System 1 also allows for quick and simple notification of drivers/subscribers in the event a situation arises in which a single subscriber or a group thereof needs to be notified. Further, monitored parking data created by traffic lights 100 and sensing device 200 may be available for purposes other than for managing parking, such as by city planners.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. A method of managing parking spaces in a geographical area, comprising:
    monitoring a geographical area with a sensor located in the geographical area, the sensor arranged such that multiple parking spaces are within a field of view of the sensor, the multiple parking spaces along at least two streets;
    identifying one or more of the multiple parking spaces as available parking spaces in the geographical area with a computing device in communication with the sensor, the identifying based at least partly upon the monitoring;
    informing, over the air interface, one or more vehicle operators about a first available parking space of the one or more available parking spaces identified; and
    completing a parking reservation for the first available parking space with a first vehicle operator of the one or more vehicle operators.

2. The method of claim 1, further comprising receiving a first indication from the first vehicle operator when the first vehicle operator arrives at the first available parking space, receiving a second indication from the first vehicle operator when a vehicle of the first vehicle operator is leaving the first available parking space, and calculating a parking fee based upon a time when the first indication is received and a time when the second indication is received.

3. The method of claim 1, further comprising receiving from the first vehicle operator a request to extend a duration of the parking reservation, and sending a reply to the first vehicle operator responsive to the request to extend the duration of the parking reservation.

4. The method of claim 1, further comprising repeating the monitoring, the identifying and the informing at predetermined times.

5. The method of claim 1, further comprising receiving from one or more vehicles in the geographical area parking space information of parking spaces in the geographical area, wherein identifying one or more available parking spaces in the geographical area is based at least partly upon the received parking space information.

6. The method of claim 1, further comprising indicating at the first available parking space of a period of time corresponding to the parking reservation for the first available parking space.

7. The method of claim 1, further comprising, sending a notification to the first vehicle operator that the parking reservation is nearing an end or has ended.

8. The method of claim 1, wherein informing the one or more vehicle operators comprises updating a software application with data corresponding to the first available parking space, the one or more vehicle operators being subscribers of the application.

9. The method of claim 1, further comprising determining that a second available parking space of the one or more available parking spaces is impermissibly occupied, determining that the second available parking space is occupied by a vehicle associated with a second vehicle operator of the one or more vehicle operators, and sending a message to the second vehicle operator to reserve the second available parking space.

10. The method of claim 1, further comprising determining that a second vehicle has parked in a no-parking location in the geographical area, determining that the second vehicle is associated with a second vehicle operator of the one or more vehicle operators, and sending a message to the second vehicle operator that the second vehicle is parked in the no-parking location.

11. A program code product for managing parking spaces in a geographical area, the program code product stored in non-transitory memory and including instructions which, when executed by a processor, causes the processor to perform:
- monitoring a geographical area with a sensor located in the geographical area, the sensor arranged such that multiple parking spaces are within a field of view of the sensor, the multiple parking spaces along at least two streets;
- identifying one or more of the multiple parking spaces as available parking spaces in the geographical area with a computing device in communication with the sensor, the identifying based at least partly upon the monitoring;
- informing one or more vehicle operators about a first available parking space of the one or more available parking spaces identified; and
- completing a parking reservation for the first available parking space with a first vehicle operator of the one or more vehicle operators.

12. The program code product of claim 11, further comprising instructions for receiving a first indication from the first vehicle operator when the first vehicle operator arrives at the first available parking space, receiving a second indication from the first vehicle operator when a vehicle of the first vehicle operator is leaving the first available parking space, and calculating a parking fee based at least partly upon a time when the first indication is received and a time when the second indication is received.

13. The program code product of claim 11, further comprising instructions for receiving from the first vehicle operator a request to extend a duration of the parking reservation, and sending a reply to the first vehicle operator responsive to the request to extend the parking reservation.

14. The program code product of claim 11, further comprising instructions for repeating the monitoring, the identifying and the informing at predetermined times.

15. The program code product of claim 11, further comprising instructions for receiving from vehicles in the geographical area parking space information of parking spaces in the geographical area, wherein identifying one or more available parking spaces in the geographical area is based at least partly received parking space information.

16. The program code product of claim 11, further comprising instructions for indicating at the first available parking space of a period of time corresponding to the parking reservation for the first available parking space.

17. The program code product of claim 11, further comprising instructions for determining that a vehicle in the geographical area is impermissibly parked, determining that the impermissibly parked vehicle is associated with a second vehicle operator of the one or more vehicle operators, and sending a message to the second vehicle operator concerning the impermissibly parked vehicle.

18. The program code product of claim 11, wherein the program code product utilizes a self-learning algorithm for identifying the one or more available parking spaces in the geographical area.

19. The method of claim 1, wherein the sensor is mounted on a traffic light.

20. The method of claim 1, wherein the sensor is arranged at an intersection of two streets in the geographical area.

21. The method of claim 1, further comprising monitoring the geographical area in four directions with the sensor.

* * * * *